Patented Oct. 27, 1931

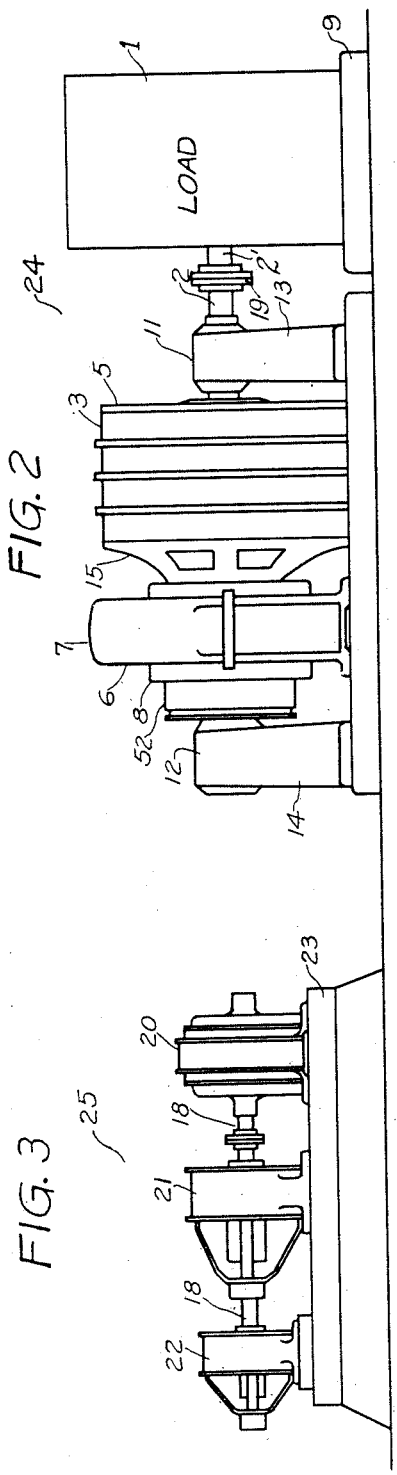

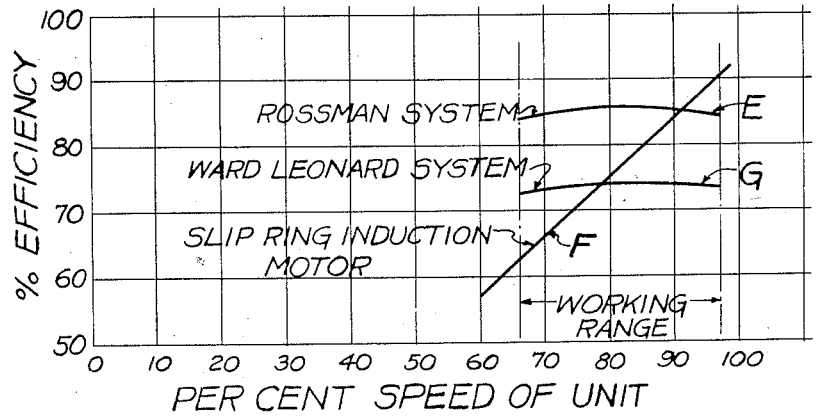
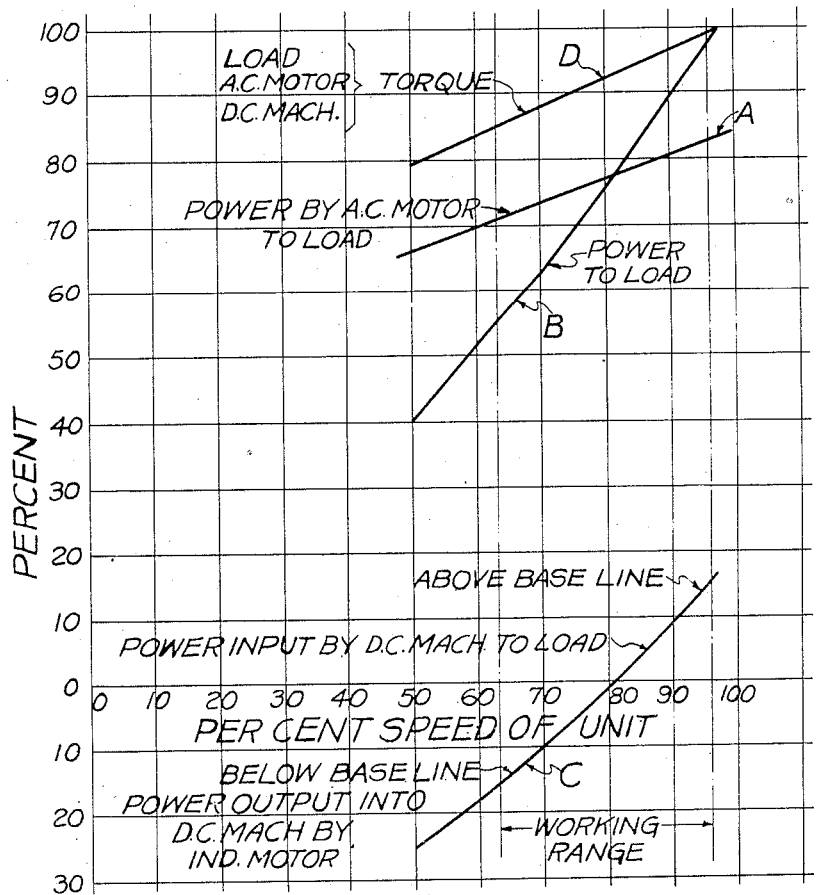

1,828,943

UNITED STATES PATENT OFFICE

ALLEN M. ROSSMAN, OF CHICAGO, ILLINOIS, ASSIGNOR, BY MESNE ASSIGNMENTS, TO ROSSMAN PATENTS, INCORPORATED, OF CHICAGO, ILLINOIS, A CORPORATION OF ILLINOIS

ADJUSTABLE SPEED DRIVE

Application filed May 7, 1928. Serial No. 275,641.

My invention relates to variable speed drives. The present invention comprises an improvement upon the variable speed drive of my prior application, Serial No. 227,208, filed October 19, 1927.

While I shall describe my invention as applied to the specific work of operating a coal grinder or pulverizing mill for producing powdered coal, that is but one of a multitude of uses to which my invention may be put, and the specific illustration of the use is not intended to be in anywise limiting.

Where ample direct current power is available, variable speed driving is readily secured. Also variable speed driving may be secured by the use of a wound rotor alternating current motor, but the efficiency is bad.

The problem which confronts me, however, is that of providing an alternating current drive which will be efficient, readily controllable and capable of use in handling large amounts of power.

Powdered coal for firing the boilers of a modern electric generating plant has come into favor because of the increase in efficiency which it makes possible. Likewise large fans or blowers are required for forced drafts and other purposes, mainly relating to efficiency of operation of the plant. These devices require relatively large amounts of power at variable speed, and efficiency of operation is an important and desirable factor. According to present-day practice in power generating plants the thermodynamic energy of the steam is transformed into alternating currents by the use of units of great capacity and of high efficiency. Alternating current of relatively low cost is, therefore, available. There is a pronounced demand in the art for an efficient variable speed drive operating on alternating current. The present invention aims to provide a device which will meet that demand.

In studying the problem I have observed that while the power employed is relatively great, the range of actual speed variation is generally not great on either side of a normal or preferable speed. If the efficiency can be kept high at the average speed, a great advantage will be gained.

In my prior application aforesaid I have disclosed a variable speed drive wherein the work done by the alternating current motor is divided into two parts, one part being done upon the desired load and the other being an energy transformation into direct or asynchronous current, and that current being transformed into useful effort or work applied mechanically to the load.

Due to the necessity of transforming the second part of the work of the alternating current motor into mechanical effort exerted upon the load, there must be a mechanical connection from the direct current motor employed therein to the load device, as well as the mechanical connection from one element of the alternating current motor to the same load device. This requires a large unitary foundation and produces an inconveniently long unit for which space is not readily obtainable.

In addition, the prior arrangement left something to be desired in point of efficiency because the alternating current motor must always be run at a speed greater than the desired speed of driving the load with a resultant transformation of sufficient power to disturb the efficiency of the drive. As the speed should be capable of variation on either side of the normal running speed and since the percentage of power to be transformed is equal to the percentage of speed variation on either side of the mean or fixed speed of the A. C. motor, it can be seen that the losses of the double electrical transformation of my prior device is always involved with respect to a sufficient amount of power to disturb the efficiency of the unit as a whole.

According to the present invention, I divide the work of the alternating current motor into two parts, the first part being applied directly to the load mechanically. The second part is through intermediate changes, if it is greater than zero, transformed into synchronous alternating current and is returned to the power supply line or source which feeds the alternating current motor.

If the second part of the work is less than zero, that is, constitutes input, it is applied to and through both motor elements of the alternating current motor to increase the speed of the load. The additional power required therefor is secured by transforming more alternating current from the line through a second alternating current motor into asynchronous current which is utilized in increasing the speed of the motor. In the preferred form of my invention I select the speed of the main alternating current motor such that it falls substantially upon the normal desired speed of the load. Then in order to secure variation of speed below the desired normal, I transform a part of the work of the motor back into alternating current, which is fed back into the supply line. If the speed is to be brought above the selected normal speed, then additional current is drawn from the line, and through a suitable electrodynamic transformation is applied to the main alternating current motor to increase the speed of both elements thereof.

Now since by my present scheme the transfer of power to increase or decrease the speed is wholly electrical, I can divide the mechanism necessary to secure the desired result into two units, one unit including the main alternating current motor with an element thereof connected directly to the load shaft, and a direct current unit operating either as a motor or generator mounted upon one foundation. Another unit comprises a high speed motor generator set which may be located at any convenient position, and due to the fact that it may operate at high speed, may be reduced in compass.

There is produced thereby a more convenient arrangement of parts, and as will be set out more in detail later, better average efficiency throughout the range of operation.

In the preferred form of my invention I provide the main alternating current motor with both elements rotatable, either element being connectible to the load, but preferably the part normally designated as rotor, which is the inner element, being so connected to the load because of its smaller mass and diameter. Obviously the connection of the elements may be reversed. The element which is not connected to the load is connected to the armature of a direct current machine which may operate either as a motor or generator. The second high speed unit comprises a small high speed alternating current motor direct connected to a second direct current machine and also to a small direct current exciter for supplying field current to the direct current machine of the first unit, and likewise to the field of the second direct current machine which latter is driven by the high speed alternating current motor. The second direct current machine operates either as a motor or generator under the control of its field rheostat, which field rheostat is the governing device for governing the speed of the driven load.

Now in order to acquaint those skilled in the art with the manner of constructing and operating a device embodying my invention and how to practice the method herein disclosed, I shall describe in connection with the accompanying drawings a specific embodiment of the invention and describe its mode of operation.

In the drawings:

Fig. 1 is a diagram of the variable speed drive of my invention.

Fig. 2 is a side elevational view of a main driving unit and its connected load.

Fig. 3 is a side elevational view of the auxiliary unit.

Fig. 4 is a diagrammatic illustration of the controlling rheostat connection.

Fig. 5 is a side elevational view of the controlling rheostat.

Fig. 6 is a front elevational view of the same.

Fig. 7 is a diagram giving the characteristic curves of the system of my invention; and Fig. 8 is a diagram giving the efficiency curves of my system as compared with other known schemes.

Referring now to Figs. 1 and 2, the load device 1 which in the present instance is a grinder for powdering coal, has a drive shaft 2', through which all of the mechanical effort upon the load is exerted. This drive shaft 2' is connected through a suitable coupling 19 to an element 4 of the alternating current motor device 3, which is mounted upon the aligned motor shaft 2.

The other element 5 of the alternating current motor 3 is connected to the armature 6 of a direct current unit 7 having the field member 8. The alternating current motor 3 is thus connected in differential relation between the load and the D. C. motor 7.

The physical embodiment of what is shown in diagram in Fig. 1 appears in side elevation in Fig. 2. The two electrical units 3 and 7 are mounted upon a common base, and the load device 1 is mounted on an independent base 9 suitable for supporting said load. The shaft 2 which is mechanically connected to the load through a suitable coupling 19, is supported in bearings 11 and 12 in the trunnion brackets 13 and 14. The shaft extends through the direct current unit 7, the armature 6 being rotatably mounted on said shaft 2, and the element 5 of the alternating current motor 3 being connected to the armature 6, as for example by means of the conical shell 15, this same connection being shown in the diagram of Fig. 1 by the shaft 16.

Whereas it is customary to describe the inner rotating member of an alternating current motor as the rotor, and the outer stationary part as the stator, I wish to call attention to the fact that the two elements 4 and 5 in the present case are permitted to have rotation with respect to the supporting structure and with respect to each other.

While in the preferred embodiment I employ for the unit 3 an induction motor of the squirrel cage type I wish to point out that I am not to be limited to this specific form of alternating current motor, as will more presently appear.

At the left of the diagram of Fig. 1, I have shown three machines direct connected by a common shaft 18. These three machines comprise a high speed alternating current motor 20, a direct current machine 21 which may serve as either a generator or as a motor, and a direct current exciter machine 22 which operates at all times as a direct current generator. Since the relation of the set 25 of Fig. 3 to the set 24 of Fig. 2 is wholly electrical, these two sets may be positioned mechanically in any convenient arrangement, the connections being made between them by suitable conductors. The frames of the three units 20, 21 and 22 are mounted upon a convenient common base 23 and set upon a separate foundation. The rotor of the alternating current motor 20 is connected to the shaft 18. The armatures 26 and 27 of the machines 21 and 22 are likewise connected to said shaft 18.

The alternating current supply line 28 is connected to any suitable source of alternating current which, in the present case is preferably the main generating unit connected through high efficiency transformers. The motor leads 29 of the alternating current motor 3 are connected through suitable brushes 30 to the windings of the elements 5 through slip rings indicated at 31 so that the element 5 may receive its power current while it is either rotating or stationary. Branch leads 32 from the motor leads 29 lead to the windings of the alternating current motor 20 of the unit 25. A suitable switch 33 is interposed in the power line 28, and it may comprise suitable starting resistances and/or other control devices for stopping and starting the units 3 and 20.

The exciter 22 has a field element 34 controlled by a field rheostat 35. The field windings 34 are shunt windings, and as the speed of the motor 20 is substantially constant, the voltage on the exciter leads 36 is approximately constant within the range of operation.

The exciter 22 supplies field current for the field 8 of the direct current machine 7. A suitable field rheostat 37 is provided, and the excitation of the field 7 remains substantially constant throughout the operation of the system shown in Fig. 1, although the field excitation may be varied by rheostat 37, either to vary the range of operation of the drive or to extend the range to lower speeds.

The field 38 of the machine 21 is likewise excited by current taken from the exciter leads 36 through a control rheostat 40, which is in effect a reversible potentiometer. This field rheostat comprises a pair of resistances 41 and 42 connected in opposite directions across the exciter leads 36, as by means of the connections 43, 44 and 45.

A pair of movable contact members 47 and 48 actuated by a common operating member 49, which in the diagram of Fig. 1 is shown as a longitudinally movable rod for moving the contacts 47 and 48 simultaneously along the resistances 41 and 42 so that the potential and polarity impressed upon the field 38 of the machine 21 may be suitably controlled. The armature 26 of machine 21 is directly and constantly connected in series with the armature 6 of the machine 7. This connection is made by the leads 50, which run between the brushes bearing upon the commutators 51 and 52 of the machines 21 and 7, respectively.

Preferably the control rheostat 40 is embodied in a rotary device, as shown in Figs. 5 and 6, and illustrated diagrammatically in Fig. 4. This rheostat comprises a rotatable shaft 55 having moving contact arms 56 and 57 adapted to engage contacts such as 58 shown in Fig. 6, mounted on the discs or plates 59 and 60, these contacts 58 being connected by suitable resistance windings indicated at 41 and 42 in Fig. 4.

By means of a suitable handwheel 61 the potential and polarity impressed upon the field winding 38 may be controlled within the desired values. The field winding 38 is connected to the movable brushes or contact arms 57 and 56 by leads 62 and 63.

The operation of the device is as follows: Assume that the normal working speed at which the load is to be driven lies within a range of from 63 to 97 per cent of the maximum speed or complete speed range of which the device is capable of operation, and that the normal working speed is approximately midway of the working range, namely, approximately 80 per cent of full speed.

I select the speed of the alternating current motor 3, that is, the relative speed between the elements 4 and 5, substantially equal to the normal running speed. For example, if the load were to be operated at a normal running speed of 720 R. P. M., I select an alternating current motor which if the so-called stator element were held stationary, would rotate the so-called rotor 4 at substantially 720 revolutions per minute. These figures are used merely for illustration.

Now the theory of my invention is that if the speed of the load device is to be reduced below the normal running speed, the difference between the desired load speed and the proper relative speed between the elements 4 and 5 may be secured by permitting the element 5 to rotate. Now since the torque of the load controls the relative torque between elements 4 and 5, the division of work performed by the motor 3 is in proportion to the relative speed in terms of absolute value of the elements 4 and 5 respectively. Since by the original design the normal speed of the load is substantially equal to the normal relative speed between the elements 4 and 5, at the normal speed the element 5 is held stationary and the work done by the alternating current motor 3 is transmitted 100 per cent to the load and zero work is transmitted elsewhere by the member 5.

Assume now that the load is to be driven at a speed greater than the relative speed between the elements 4 and 5, I have made provisions for imparting through separate means a rotation to the element 5 which is superimposed upon the relative rotation between the elements 4 and 5 and thereby gives the load shaft 2 an absolute speed greater than the normal speed.

Now it can be seen that by this theory of operation, namely, of having the relative speed between the elements 4 and 5 of the main alternating current motor 3 equal to the normal speed of the load, regulation can be effected by handling a minimum of makeup or takeoff power through auxiliary devices. The broad result is that the overall efficiency of the set is very high. In the specific device herein illustrated I provide for a speed range of approximately 33⅓ per cent based on maximum speed of the load, and the maximum amount of makeup power or takeoff power that needs to be handled is only 16⅔ per cent of the total power required by the load at maximum speed. Therefore I can obtain an overall efficiency of approximately 86 per cent at five-sixths of maximum speed of load and approximately 84 per cent at both maximum speed of load and at two-thirds of maximum speed of load. The above example is based on a 600 R. P. M. alternating current motor.

The specific manner in which the makeup power or the takeoff power are developed and applied will now be explained in detail. The device is put into operation by closing the switch 33 and starting the alternating current motor 3 and the alternating current motor 20.

A relative rotation between the elements 4 and 5 is immediately set up, which is equal to the normal rate of speed of the motor 3. The alternating current motor 20 is preferably an induction motor of the squirrel cage type operating at a speed much higher than the speed of the motor 3.

The torque which the load presents to movement is developed between the elements 4 and 5 of the motor 3, and it may be assumed in Fig. 1 that both shafts 2 and 16 will start to rotate in opposite directions. The driving motor 20 for the exciter 22 develops direct current on the exciter leads 36, energizing the field 8 of the direct current machine 7, and we will assume that because of the rotation of the shaft 16 in the opposite direction from the rotation of the shaft 2, an electromotive force will be set up at the terminals of the armature 6, which electro-motive force appears on the leads 50, which connect the armatures 6 and 26. Since the excitation of the field 8 of the direct current machine 7 is substantially constant and is always in the same direction, the direct current potential appearing on the leads 50 is decisive of the action of the armature 6. Since the alternating current motor 20 drives the armature 26 of the machine 21 at substantially constant speed, the potential appearing on the terminals of the armature 26 depends upon the field excitation of the unit 21. That is to say, assume that the field rheostat 40 is set to one end of its range, a maximum potential of one polarity will appear on the brushes of the commutator 51, which brushes are connected to the leads 50 leading to the brushes of the commutator 52. Armature 6 of machine 7 will then rotate at such a speed as to generate a counter-potential at the brushes of its commutator 52 which shall be equal to the impressed potential generated by machine 21. As the field rheostat is gradually moved toward the other end of its range, the potential generated by machine 21 decreases and the speed of machine 6 decreases to a value where its counter-potential equals the impressed potential. Just before the excitation is reduced to 0, armature 6 comes to a standstill and then reverses its direction of rotation and becomes a direct current generator while machine 21 becomes a D. C. motor and drives machine 20 as an induction generator, delivering alternating current energy to its leads 32. With zero excitation on the fields of machine 21, machine 7 generates at its brushes sufficient potential to force the current through the external circuit against the resistances of the leads 50 and the armature 26. As the field rheostat is moved further along the direction of current flow through the field windings 38 reverses and the potential at the brushes of commutator 51 begins to build up to the opposite polarity. Machine 7 then tends to operate at such a speed that it will generate sufficient potential to cause the required current to flow against the counter-potential existing on the brushes of commutator 51. The direction of flow of current through armatures 6 and 26 and through leads 50, is the same throughout the entire speed cycle just described, and its amount is determined by the torque requirements of the load. A characteristic of the system, therefore, is that the direct current machine 7 may operate either as a brake to retard or stop the motion of the element 5 or drive it in the opposite direction.

Thus by the simple manipulation of the control rheostat 40, the speed at which the load is driven may be controlled within the selected range. The range may be extended, particularly for lower speeds of the load, by inserting resistance into the circuit of the field 8, by means of the rheostat 37.

In order to clarify the operation of the device I have appended hereto the characteristic curves on Figs. 7 and 8. Referring now to Fig. 7, the abscissæ on the horizontal line represent the per cent of maximum speed of which the unit is capable. The ordinates represent the per cent of the respective variables as shown by the legend applied to the respective curves. The curve A represents the power delivered by the alternating current motor 3 to the load 1. This, of course, is a maximum when the element 5 is driven by armature 6, and the work done by both the alternating current motor and the direct current machine 7 at full or one hundred per cent speed of the unit is applied to the load.

The curve B is the curve of total power applied to the load. This is made up of the power shown by the curve A plus the power shown by the curve C, which represents the positive or negative power input of the machine 7. In other words, the curve B is the sum of curves A and C.

It will be seen that the curve C extends part way above the base line and part way below the base line. This means at the higher part of the working range, that is, above the normal working speed of the load which is on approximately the 80 per cent abscissa, the curve passes above the zero line. Below the normal running speed of the load the curve passes below the zero line. This means that for the right hand part of the curve C the direct current machine 7 is operating as a motor, and for the left hand part of the curve C the machine is operating as a generator.

The curve D on Fig. 7 is the torque curve for the particular load under consideration. This is substantially a straight line. Since the torque of the load is transmitted through the alternating current motor 3, then through the armature 6 of the direct current machine 7, the torque curve D represents the torque for all three of those devices.

The curves A and B cross each other at the abscissa where the curve C crosses the zero line. This is readily understandable since when there is no power input or output by the direct current machine to the load, the element 5 is held stationary and the entire work of the motor 3 is expended upon the load.

In Fig. 8 I have shown on the horizontal abscissa the percentage of maximum rated speed of the system of my invention, and on the ordinates I have plotted efficiency.

The curve E indicates the efficiency of my present system within the working range. As is obvious from the shape of the curve, the efficiency is a maximum at substantially the normal working speed which is approximately midway of the working range of speed.

The slip ring induction motor has an efficiency as shown by the curve F. This is readily understandable because the slip ring induction motor operates on the theory of dividing the power of the motor into two parts and throwing away the part which represents the speed reduction, in the form of heat.

The curve G represents the efficiency of the Ward Leonard system. It gives substantially the same efficiency throughout the entire working range, but it is far below the efficiency of my system.

I do not intend to be limited to the idea of having the normal working speed lying substantially midway of the working range of speed, since it is possible to bring the curve C either entirely above the base line or entirely below the base line, but I have selected the optimum condition when I have the normal working speed of the load arranged to be substantially equal to the normal rated speed of the alternating current motor 3.

While I have referred to the alternating current motor 3 as an induction squirrel cage type of motor and likewise have referred to the alternating current motor 20 as of the same construction, it is to be understood that I do not intend to limit the invention to the use of squirrel cage motors, and in fact I could use synchronous alternating current motors just as well so far as the theory of the invention is concerned.

I now wish to call attention to the fact that if the squirrel cage type of motor is employed, the torque which the load presents will have a slight effect upon the relative speed between the elements 4 and 5, as is well known to those skilled in the art, due to the fact that it is the relative slip between these two elements which creates the circulating current in the squirrel cage winding, causing the two parts to exert a torque between them.

The same thing is true in respect to the motor 20, but the influence of these variations in speed because of increased slip due to increased load is of no practical consequence in my invention, and may be ignored. If synchronous motors were employed there would be a slight precession or lag, as the case might be, as to the phase of the current, but this would be of no consequence. Both direct current machines, namely, the machine 7 and the machine 21, might be excited from an independent source of direct current without relying upon the exciter 22. The rheostat 37 for the direct current machine 7 is not changed to secure speed control or variation within the range of speeds shown. If the torque of the load falls off as the speed of the load is decreased then an extension of the range can be secured by inserting resistance at rheostat 37. This reduces the field excitation and permits the armature 6 to be driven at higher speed in order to generate the required electromotive force. All that is changed is the rheostat 40. Speed variation is accomplished by varying the excitation of the direct current machine 21 from a maximum in one direction through zero to a maximum in the opposite direction. At a point where the excitation on machine 21 is close to zero, the direct current machine 7 changes its polarity and its direction of rotation, and also changes its function from motoring to generating. The value of current flowing through the leads 50 is substantially proportional to the torque requirements of the load. Mechanically the mechanism comprises the unit 24 which has the two electrical machines 3 and 7 on the main driving shaft, and the unit 25 which is a small high speed motor generator set carrying a direct current exciter.

I believe it is broadly new to select the normal running speed of the alternating current motor 3 equal or substantially equal to the normal running speed of the load 1.

I believe, also, that it is broadly new, independently of whether the speed of the machine 3 is selected equal to the normal running speed of the load 1, to have the supplemental work subtracted or added by a single machine which operates either as a generator or motor, as the case may be, and it is broadly new to convert the subtracted work back into synchronous current imposed upon the supply line.

I wish to call attention to the fact that if desired, and within my invention, the selected speed of the motor 3 may be the maximum speed of the load 1, and the subtracted work of the motor 3 which permits of reduction of speed, may be transformed into synchronous alternating current, and then the controlling rheostat 40 need not reverse the polarity of the fields 21. In that event the exciter 22 need not be supplied. This is because the field of machine 21 is excited in one direction only and at no time is the machine required to operate as a motor, with the result that it may be made self-exciting. In that event the field excitation of machine 7 would also be varied. Instead of making the machine 21 self exciting, the machine 7 might be made self exciting. Likewise if the selected speed of the motor 3 be the minimum speed of the load and the auxiliary work is always additive or positive, the field rheostat 40 need not be reversible, and the exciter 22 may be dispensed with for the reason previously given, that the machine 21 then acts always as a generator driven by the alternating current motor 20 and supplies current to drive the armature 6 of the machine 7 which operates always as a motor. In such latter cases where the auxiliary work is either all additive to, or subtractive from the work of the motor 3 throughout the entire range, the unit 25 would have to handle a percentage of the total work done, which is represented by and equal to the percentage of speed variation.

As the main motor 3 is of the constant speed type, being preferably a squirrel cage motor, or a synchronous motor, and as the auxiliary motor 7 is also of the constant speed type (in the system shown, a separately excited direct current dynamo electric machine) the drive has the inherent capability of holding to a substantially fixed speed for a given setting of the controller 40.

The inherent capability of regeneration of power of a live load is also present. That is to say, in case of a traction load or the like, any tendency of the load to run ahead of the speed for which the drive is set will result in the regeneration of alternating current by the machine 3 and direct current by the machine 7, substantially in proportion to the speeds of each for a given controller setting. Thus the drive has the capability of regenerative braking throughout its entire speed range.

In the preferred mode of operation the capacity of the motor generator set 25 needs to be only half of the total power required for regulation of speed. That is because half of it is positive and the other half is negative.

The alternating current motor is able to return power to the line when driven as a generator from the known ability of an alternating current motor if its primary winding is excited to return power to the line when power is applied tending to drive it faster than synchronous speed. This is true not only of a squirrel cage motor but also of a synchronous motor and other types.

While I have shown the two alternating current motors 3 and 20 connected in parallel to the same source 28, I do not intend by the statement that they are connected in parallel to mean that they must be connected to the same source as obviously they may be connected to two separate sources, and the mode of operation and the advantages are identical.

I claim:

1. A system of adjustable speed alternating current drive comprising an alternating current drive motor of a constant speed type, an alternating current supply line therefor, a load shaft to be driven at controllable speeds throughout a range of speeds extending partly above and partly below a speed corresponding to the constant speed of the alternating current drive motor, an auxiliary direct current drive motor having a separately excited field and having its armature connected to an adjustable speed drive shaft, said alternating current motor being connected in differential drive relation between the drive shaft of the direct current motor and the load shaft, means for controlling the speed and direction of motion of the direct current motor comprising a direct current generator operated at a constant speed by an alternating current motor connected to said supply line, said generator having a separately excited field and an armature which is connected electrically in series with the armature of the direct current motor, and means for gradually changing the polarity and strength of the field excitation of the direct current generator to govern the polarity and voltage generated in the armature thereof, said changes of generated voltage and polarity controlling the speed and direction of rotation of the direct current motor and governing the interchange of power between the alternating current supply line and the load.

2. A system comprising the combination of claim 1, wherein the last named means comprises a reversible rheostat for changing the polarity and magnitude of the field excitation of the direct current generator, said rheostat permitting the field excitation to be reduced to substantially zero value to hold the direct current motor and the connected frame member of the alternating current motor substantially stationary.

3. A system comprising the combination of claim 1, wherein the last named means comprises a reversible rheostat providing a gradual change of voltage impressed upon the field of the direct current generator from maximum strength of one polarity through zero to maximum strength in the opposite polarity, the generated voltage of the direct current armature being changed correspondingly and the speed and direction of the direct current motor being controlled thereby to rotate in a direction corresponding to the polarity impressed upon the direct current generator field and at a speed in proportion to the degree of excitation, the speed of the final drive being thereby adjusted from maximum to minimum without discontinuity or instability at any setting.

4. The combination of claim 1, wherein the load shaft is connected to a load the torque of which decreases as the speed decreases, with means for reducing the excitation of the field of the direct current motor to extend the range of attainable speeds at the low speed end of the range.

5. A system of adjustable speed control comprising a main alternating current drive motor of constant speed type having a frame member and a rotor member, both members being mounted for independent rotation, a direct current drive motor having a separately excited field and having its armature connected mecanically to the frame member of the main motor, said connection permitting transmission of power in either direction, a motor generator set for controlling the speed and direction of motion of the direct current drive motor, said set comprising an alternating current motor of constant speed type, and a direct current generator having a separately excited field and an armature which is connected mechanically to the last named alternating current motor and is connected electrically in series with the armature of the direct current motor, and means to adjust in relatively fine graduations the polarity and strength of the field excitation of the direct current generator to govern the polarity and voltage generated in the armature thereof, said adjustments of generated voltage and polarity controlling the speed and direction of rotation of the direct current motor and the interchange of power between the alternating current supply system and the load.

6. A system of adjustable speed alternating current drive comprising a main alternating current drive motor of a constant speed type. an alternating current supply line therefor, a load shaft to be driven at controllable speeds throughout a range of speeds extending partly above and partly below the constant speed of the main alternating current motor, an auxiliary direct current drive motor having a separately excited field and having its armature connected to an adjustable speed drive shaft, said main alternating current motor being connected in differential drive relation between the drive shaft of the direct current motor and the load shaft, a motor generator set for controlling the speed and direction of motion of the direct current drive motor, said set comprising an alternating current motor of a constant speed type connected to the supply line and a direct current generator having a separately excited field, and an armature which is connected mechanically to the last named alternating current motor and which is connected electrically in series with the armature of the direct current motor, and means for gradually changing the polarity and strength of the field excitation of the direct current generator to govern the polarity and voltage generated in the armature thereof, said changes of generated voltage and polarity controlling the speed and direction of rotation of the direct current motor and governing the interchange of power between the alternating current supply line and the load.

In witness whereof, I have hereunto subscribed my name this 3rd day of May, A. D. 1928.

ALLEN M. ROSSMAN.